United States Patent
Preston

[11] 3,891,693
[45] June 24, 1975

[54] METHOD FOR MAKING ALKYLENE-BIS(NITROBENZOATE)S

[75] Inventor: Jack Preston, Raleigh, N.C.

[73] Assignee: Monsanto Company, St. Louis, Mo.

[22] Filed: Aug. 1, 1974

[21] Appl. No.: 494,019

Related U.S. Application Data

[63] Continuation-in-part of Ser. No. 353,285, April 23, 1973.

[52] U.S. Cl. .................................. 260/471 R
[51] Int. Cl. .................................. C07c 101/68
[58] Field of Search ........................... 260/471 R

[56] References Cited
UNITED STATES PATENTS
3,736,350  5/1973  Meckel et al. ............... 260/471 R Primary Examiner—Lorraine A. Weinberger
Assistant Examiner—L. A. Thaxton
Attorney, Agent, or Firm—S. M. Tarter; J. W. Whisler

[57] ABSTRACT

A method is provided for making alkylene-bis(nitrobenzoate)s having the following formula:

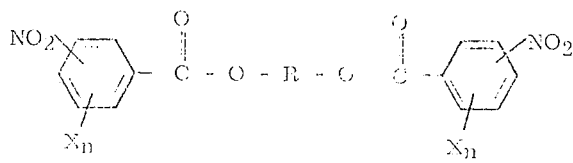

wherein X is a halogen, n is an integer of 0–4 and R is a $C_2$–$C_8$ alkylene radical. Alkylene-bis(aminobenzoate)s can be made conveniently therefrom and are useful in the preparation of flame resistant polyester-amide fibers.

4 Claims, No Drawings

METHOD FOR MAKING ALKYLENE-BIS(NITROBENZOATE)S

BACKGROUND OF THE INVENTION

Much effect is being devoted in the man-made filament industry to produce at reasonable cost fibrous articles that are more flame resistant. This is out of the concern for the safety of inhabitants of the buildings where drapes and especially carpets are nowadays in widespread and common use. During an intense fire even the flame resistant fibers will burn and smoke. The provision of fibers having low smoke generation is a desideratum of long standing. It has now been found that certain polyester-amide fibers can be produced from certain alkylene-bis(aminobenzoate)s and aromatic dicarboxylic acids and are flame resistant and if burned emit a low level of smoke. Alkylene-bis(aminobenzoate)s can be made by the hydrogenation of corresponding alkylene-bis(nitrobenzoate)s.

The known methods for preparing the alkylene-bis(aminobenzoate)s are fraught with difficulties. In an attempt to synthesize this diamine Cretcher et al reported *J. Am. Chem. Soc.*, 47, 2560 (1925) trying to prepare 1,2-ethylene-bis(p-aminobenzoate) by heating 2-hydroxyethyl p-aminobenzoate and at an elevated temperature to eliminate ethylene glycol. However, only decomposition products were obtained. They found it possible to prepare the dinitro precursor of the diamine by heating 2-hydroxyethyl p-nitrobenzoate with the elimination of ethylene glycol. But, this synthesis requires the isolation of the intermediate 2-hydroxyethyl p-nitrobenzoate and the latter's pyrolysis as separate steps.

The preparation of dinitro esters of several glycols by means of iodo-silver complexes is known. The resulting dinitro precursors are reduced to corresponding diamines. Unfortunately, the use of such complexes is expensive and the yields of dinitro compounds are poor. U.S. Pat. No. 3,736,350 discloses preparation of certain alkylene-bis(nitrobenzoate)s. This is accomplished by heating two moles of a halogen substituted nitrobenzoic acid and one mole of ethylene glycol. Although the reaction takes place at an elevated temperature, the reaction proceeds very slowly requiring many hours to reach completion. Moreover, yields are poor with undesirable by-products being formed.

SUMMARY OF THE INVENTION

A method is provided for making alkylene-bis(nitrobenzoate)s having the following formula:

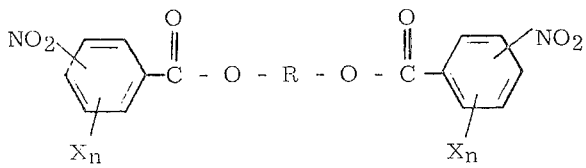

wherein X is a halogen, n is an integer of 0–4 and R is a $C_2$–$C_8$ alkylene radical. In accordance with the present invention this is accomplished by bringing into reacting contact a nitrobenzoic acid and a suitable saturated aliphatic or alicyclic glycol at an elevated temperature in substantially stoichiometric amounts to produce the corresponding hydroxycycloalkyl or hydroxyalkyl nitrobenzoate. After the production of this half-ester has been substantially completed, an additional stoichiometric amount of the nitrobenzoic acid is brought into reacting contact with the half-ester. The resulting mixture is heated to produce the alkylene-bis(nitrobenzoate). Water of reaction flashes from the reaction during both stages as the reaction proceeds toward completion. The resulting bis-benzoate product is separated from the reaction mixture and purified by conventional procedures, such as by precipitation from a solution of the product.

DETAILED DESCRIPTION OF THE INVENTION

Specifically, the present invention provides for the direct esterification of nitrobenzoic acid, preferably p-nitrobenzoic acid, with a lower alkylene glycol, preferably ethylene glycol, to produce alkylene-bis(nitrobenzoate), preferably 1,2-ethylene-bis(p-nitrobenzoate). The term "$C_2$–$C_8$ alkylene radical" means any divalent saturated aliphatic or alicyclic radical having 2–8 carbon atoms. The esterification may be accomplished with or without the use of a catalyst. The purification of the benzoate can be effected readily by crystallization from common amide type solvents, e.g., N,N-dimethylacetamide.

The esterification is conveniently carried out in two steps. In the first step substantially equal molar amounts of a nitrobenzoic acid and the selected glycol are heated together to form a hydroxycycloalkyl or hydroxyalkyl nitrobenzoate. Often it is desirable to employ excess glycol to facilitate the reaction occurring during the first step. Any such glycol should be removed from the reaction mixture prior to proceeding to complete esterification. In the second step an additional substantially equal molar amount of nitrobenzoic acid is added to the reaction product of the first step and the resulting mixture is heated to form the desired alkylene-bis(nitrobenzoate). Excellent product yields are obtained.

As indicated above, one reactant of the present invention is a nitrobenzoic acid, including p-nitrobenzoic acid, m-nitrobenzoic acid, o-nitrobenzoic acid 1-chloro-4 nitrobenzoic acid, 2-bromo-4 nitrobenzoic acid, 2,3-dichloro-4 nitrobenzoic acid and the like. The other reactant is a lower alkylene glycol, including ethylene glycol, propylene glycol, 1,4-butanediol, 1,5-pentanediol, neopentyl glycol, trans-1,4-cyclohexanediol, trans-1,4-cyclohexanedimethanol, and the like.

The selected nitrobenzoic acid and diol are brought into reacting contact at an elevated temperature. The reaction may be carried out in a solvent medium, by direct contact, by interfacial techiques, or by other known procedures.

It has been found that the reduction of the resulting alkylene bis(nitrobenzoate) with hydrogen to the corresponding diamine can be carried out in N,N-dimethylacetamide or other suitable solvent. The resulting diamine can be polymerized with a diacid chloride in N,N-dimethylacetamide and the resulting polymer can be spun into flame retardant fibers using the same solvent.

Among the products produced by the present invention are 1,2-ethylene-bis(p-nitrobenzoate), 1,2-ethylene-bis(m-nitrobenzoate), 1,2-ethylene-bis(o-nitrobenzoate), 1,2-propane-bis(p-nitrobenzoate), 1,2-propane-bis(m-nitrobenzoate), 1,2-propane-bis(o-nitrobenzoate), 2,2-dimethyl-1,3-propane-bis(p- nitrobenzoate), 2,2-dimethyl-1,3-propane-bis(m-nitrobenzoate), 2,2-dimethyl-1,3-propane-bis(o-nitrobenzoate), 1,4-butane-bis(p-nitrobenzoate), 1,4-butane-bis(m-nitrobenzoate), 1,4-butane-bis(o-nitrobenzoate), 1,2-ethylene-bis (2-chloro-4-nitrobenzoate), trans-1,4-cyclohexane-bis(p-nitrobenzoate), trans-1,4-cyclohexyldimethyl-bis(p-nitrobenzoate), and the like.

The temperature at which the reaction between the benzoic acid and diol is carried out is not critical. The temperature should be at least sufficient to cause the reaction to proceed at a reasonable rate but not too high with the result of forming unwanted impurities. A temperature of about 150°–300°C. normally meets these criteria.

The following examples illustrate the practice of the present invention.

EXAMPLE I

A slurry of 167 grams (1 mole) of commercial grade p-nitrobenzoic acid and 61 grams (1 mole) of fiber-grade ethylene glycol was heated to 240°C. in a round bottom flask fitted with a magnetic stirring device and a side-arm distillation head. The water of reaction plus unreacted ethylene glycol was collected during a four hour period after which time the contents of the flask were cooled to about 140°C. and a second portion (167 grams) of p-nitrobenzoic acid was added to the flask. Heating at 220°C. was continued for 2 hours. Then, 100 grams of xylene was added to the flask and the resulting mixture was refluxed under azeotropic conditions for a period of 16 hours with water being separated.

The xylene was stripped from the flask and the contents of the flask cast to solidify the product. 303 grams of purified 1,2-ethylene-bis(p-nitrobenzoate) were produced. The purified product had a melting point of 144°– °C., after recrystallization from ethyl acetate-ethanol solvent. The product was further recrystallized from N,N-dimethylacetamide-water. The overall yield of pure product based on p-nitrobenzoic acid was 90 percent.

EXAMPLE II 1,2-ethylene-bis(m-nitrobenzoate) was produced following the procedure of Example I except that m-nitrobenzoic acid was used instead of the para-isomer. An excellent yield of the product was obtained which had a melting point of 128°–130°C.

EXAMPLE III 1,2-ethylene-bis(o-nitrobenzoate) was produced following the procedure of Example I except that o-nitrobenzoic acid was used instead of the para-isomer. An excellent yield of the product was obtained which had a melting point of 132°–134°C.

EXAMPLE IV

The use of xylene can be eliminated and the reaction driven to completion by employing a vacuum finish operation to remove the water of reaction. This is illustrated by the present example.

A 10 gallon (37.85 liters) stirred autoclave was charged with 9070 grams of p-nitrobenzoic acid and 6740 grams of ethylene glycol. The system was flushed with nitrogen gas. Then, the contents of the reactor were heated to 180–185°C. over a period of about 75 minutes and held at that temperature for one hour. During this time water and glycol were distilled and collected. The temperature of the contents of the reactor was raised to 210°C. and maintained at this temperature for 2 hours to distill the excess glycol.

The reaction mass was cooled to 100°C. and 9070 grams more of p-nitrobenzoic acid were added. Then the temperature of the resulting mixture was raised to 180°C. over a period of 30 minutes. After 2 hours at this temperature the pressure on the system was reduced to approximately 60 mm. of Hg for 1 hour while maintaining the 180°C. temperature in the autoclave. After cooling the reactants to 150°C. over a period of 30 minutes, the vacuum was broken with nitrogen gas. Four gallons (15.14 liters of N, N-dimethylacetamide was added to the autoclave. After adequate mixing, the resulting hot solution was discharged from the reactor and 1 gallon (3.78 liters) of N, N-dimethylacetamide was used to rinse the reactor. To the combined solution plus rinse in a 30 gallon (113.55 liter) drum were added 2 gallons (7.57 liters) of hot water and the mixture was allowed to stir very slowly for 12 hours. A precipitate formed.

The precipitated product was filtered. The filtrate was returned to the drum and heated to about 90°C. by sparging steam therein. Seven gallons (26.49 liters) of hot water was added, the mixture was stirred for 1 hour, and a second crop of precipitated product was taken. The wet filter cakes were reslurried in the drum for one hour with 10 gallons (37.85 liters) of water containing 3.5 lb. (1.58 kilogram) of sodium carbonate. After filtering, the product was washed with water and dried overnight at 50°C. in a forced air tray drier. An 86.5 percent yield of 1,2-ethylene-bis(p-nitrobenzoate) was obtained.

EXAMPLE V

The ethylene-bis(p-nitrobenzoate) of Example IV was reduced to ethylene-bis(p-aminobenzoate). This was carried out in 20 lb. (9.07 kilograms) lots by hydrogenation in the autoclave using N,N-dimethylacetamide as solvent and Raney nickel as catalyst at a reaction temperature of 90°C. and a pressure of 8 atmospheres. A 91.7 percent yield of diamine was obtained. The diamine had a melting point of 222°–223°C.

EXAMPLE VI

With warming in a Parr pressure bottle a solution of 36 g (0.1 mole) of 1,2-ethylene-bis(p-nitrobenzoate) from Example I in 130 ml. of N,N-dimethylacetamide was prepared. To this solution was added one gram of 5 percent Pd on charcoal catalyst. After a purge with nitrogen gas followed by three purges of hydrogen gas, the bottle was pressured to 58 psi (4.1 kgs/cm$^2$) with hydrogen and the shaking action was begun. A stoichiometric amount of hydrogen was taken up in about one hour. Shaking was continued for an additional hour at 55 psi (3.9 kgs/cm$^2$).

The contents of the bomb were filtered through a filter bed and the filtrate heated to 85°C. An equal volume of water at 85°C. was dripped into the filtrate and the product was allowed to crystallize. A 91 percent yield of product was obtained. The product had a melting point of 218°–219°C.

EXAMPLE VII 1,2-Ethylene-bis(m-aminobenzoate) was prepared following the procedure of Example VI and using the 1,2-ethylene-bis(m-nitrobenzoate) of Example II. The resulting product had a melting point of 132°–138°C.

EXAMPLE VIII 1,2-Ethylene-bis(o-aminobenzoate) was prepared following the procedure of Example VI and using the 1,2-ethylene-bis(o-nitrobenzoate) of Example III. The resulting product had a melting point of 118°–120°C.

EXAMPLE IX

To a solution of 0.75 gram (0.0025 mole) of 1,2-ethylene-bis(p-aminobenzoate) of Example VI in 4 ml. of N,N-dimethylacetamide at 0°C. was added 0.5 gram (0.0025 mole) of isophthaloyl chloride with stirring. Stirring was continued for 20 minutes. The contents were allowed to rise to room temperature over a period of 30 minutes. Films from the resulting polymer solution were spread on a glass plate and baked at 110°C. to remove the solvent. It was noted that a clear, tough film was obtained. Exposure of the film to a flame showed that the film would burn but little smoke was generated. A strong tendency of the film to intumesce was noted.

EXAMPLE X

Using the procedure of Example I, 1,2-ethylene-bis(2-chloro-4-nitrobenzoate) was produced by reacting together ethylene glycol and 2-chloro-4-nitrobenzoic acid. An excellent yield (90 percent) of product was obtained which had a melting point of 136°–138°C.

Reduction of the dinitro compound following the procedure of Example VI produced an excellent yield of 1,2-ethylene-bis(2-chloro-4-aminobenzoate) having a melting point of 162°–164°C.

EXAMPLE XI

Following the general procedure of Example I, neopentyl glycol was reacted with p-nitrobenzoic acid to give an excellent yield of 2,2-dimethyl-1,3-propane-bis(p-nitrobenzoate) which had a melting point of 136°–138°C.

Reduction of the dinitro compound with hydrogen following the procedure of Example VI produced an excellent yield of 2,2-dimethyl-1,3-propylene-bis(p-aminobenzoate) having a melting point of 154°–156°C.

EXAMPLE XII

Using the procedure of Example I, 1,4-butane-diol was reacted with p-nitrobenzoic acid to produce an excellent yield of 1,4-butant-bis(p-nitrobenzoate) which had a melting point of 164°–166°C. -butane-bis(p-nitrobenzoate)

Reduction of the dinitro intermediate with hydrogen following the procedure of Example VI produced an excellent yield of 1,4-butane-bis (p-aminobenzoate) having a melting point of 206°–208°C.

EXAMPLE XIII

It is possible to use the procedure of Example I to prepare bis-benzoate esters from glycols containing cycloaliphatic rings. Two such dinitro esters were prepared: trans-1,4-cyclohexane-bis(p-nitrobenzoate) having a melting point of 234°–236°C. and trans-1,4-cyclohexyldimethyl-bis(p-nitrobenzoate) having a melting point of 180°–182°C. These dinitro compounds are readily reduced to the corresponding diamines.

What is claimed is:

1. A method of producing an alkylene-bis(nitrobenzoate) of the formula:

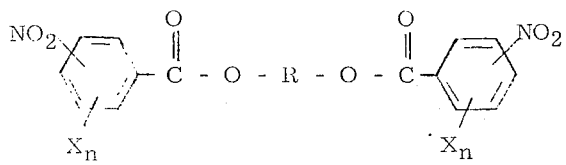

wherein X is a halogen, n is an integer of 0–4 and R is a $C_2$–$C_8$ alkylene or cycloalkylene radical characterized by:

a. bringing into reacting contact at an elevated temperature a nitrobenzoic acid and a saturated aliphatic or alicyclic glycol in substantially stoichiometric amounts to produce the corresponding hydroxycycloakyl or hydroxyalkyl nitrobenzoate;

b. after the production of the hydroxycycloalkyl or hydroxyalkyl nitrobenzoate is substantially completed, adding to the reaction mixture additional nitrobenzoic acid;

c. reacting the hydroxycycloalkyl or hydroxyalkyl nitrobenzoate with the added nitrobenzoic acid to produce the alkylene-bis(nitrobenzoate); and d. separating the resulting benzoate product from the reaction mixture.

2. The method of claim 1 wherein the alkylene or cycloalkylene glycol is selected from the group consisting of ethylene glycol, neopentyl glycol, 1,4-butanediol, trans-1,4-cyclohexanediol, and trans-1,4-cyclohexanedimethanol.

3. The method of claim 2 wherein the nitrobenzoic acid is selected from the group consisting of p-nitrobenzoic acid, m-benzoic acid, o-benzoic acid and 2-chloro- 4-nitrobenzoic acid.

4. The method of claim 1 wherein the temperature at which the reaction occurs is about 150°–300°C.

* * * * *